United States Patent [19]

Baba

[11] Patent Number: 4,807,122
[45] Date of Patent: Feb. 21, 1989

[54] INFORMATION STORAGE SYSTEM

[75] Inventor: Kazuyuki Baba, Kamakura, Japan

[73] Assignee: Mitsubishi Denki Kabushiki Kaisha, Tokyo, Japan

[21] Appl. No.: 856,070

[22] Filed: Apr. 23, 1986

[30] Foreign Application Priority Data

Apr. 23, 1985 [JP] Japan .............................. 60-86965/85

[51] Int. Cl.$^4$ .............................................. G06F 12/02
[52] U.S. Cl. ................................................. 364/200
[58] Field of Search ........................ 364/200 MS File

[56] References Cited

U.S. PATENT DOCUMENTS

| | | | |
|---|---|---|---|
| 3,701,977 | 10/1972 | Mendelson et al. | 364/200 |
| 3,942,155 | 3/1976 | Lawlor | 364/200 |
| 4,408,275 | 10/1983 | Kubo et al. | 364/200 |
| 4,611,272 | 9/1986 | Lomet | 364/200 |

*Primary Examiner*—Thomas M. Heckler
*Attorney, Agent, or Firm*—Flynn, Thiel, Boutell & Tanis

[57] ABSTRACT

An information storage system and method involve an information storage part storing plural pieces of information, a memory, and an indexing part having a plurality of key elements which are each associated with a respective piece of information in the information storage part and which are grouped into blocks having a predetermined sequence. Associated with each block are front and rear stage block specifying parts which respectively designate the immediately preceding and immediately following blocks in the sequence. A controller unit uses the front stage block specifying parts or the rear stage block specifying parts to retrieve the blocks in an order which is the predetermined sequence or the opposite of the predetermined sequence, respectively, and stores in the memory the key elements from the blocks in the order retrieved, along with the piece of information from the information storage part which corresponds to each block.

6 Claims, 3 Drawing Sheets

INFORMATION STORAGE SYSTEM

BACKGROUND OF THE INVENTION

1. Field of the Invention

The present invention relates to an information storage method for storing in a memory pieces of information stored in an information storage part in association with identification codes in an order opposite to that of an arrangement of key elements having the identification codes.

2. Description of the Prior Art

An information storage system of this type serves to store pieces of name information of persons assigned reserved seats of for example a streetcar or a bus, etc., in particular name information for each reserved seat number in an information storage part through keyed inputting operation, and to read information on the names from the rear side of the reserved seats together with the numbers of the reserved seats, or serves to store information on proceeds, etc. in an account book at each date with keyed inputting operation, and to successively read them in the order of the date and store the read information in a memory. Furthermore, the information storage system is employed for stock control wherein pieces of information of articles arranged at prescribed positions are stored with key operation and read with the opposite procedures to storing them.

Referring here to FIGS. 4 and 5, a prior information storage system will be described.

In the figures, designated at 1 is an information storage part, which part includes information storage areas 2, 3, 4, and 5 each having identification numbers 120, 130, 010, and 250 as identification codes K different in the order of arrangement thereof from each other. The information storage areas 2, 3, 4, and 5 are adapted to store desired informations A1 to A4 corresponding to the identification codes K, For example, it may be assumed that the identification numbers described above are selected as reserved seat numbers in a streetcar or a bus, etc., and the various informations A1 to A4 are the names of persons corresponding to the reserved seat numbers. Or, the identification number may be assumed to be dates, and the informations A1 to A4 to be proceeds corresponding to the dates. Such identification codes K and informations A1 to A4 are stored in the information storage part 1 as a memory means with use of a key input means and a display device. A data input device for input operation is already known.

Designated at 6 is an indexed part such as a memory means in which key elements 9 to 12 including identification numbers 010, 120, 130, 250 as the identification codes K are arranged in a prescribed direction (left to right in the figure) after which the pieces of information A1 to A4 are key-inputted into the information storage part 1. Also in this case, the key input means and the display (not shown) are employed to effect key input operation for the key elements. Thereupon, it is limited in view of read/write capability to subject in succession the key elements 9 to 12 to the key operation laterally. Consequently, the key elements 9 to 12 are divided into blocks 7, 8 for each prescribed number of the key elements. Since the block 7 includes key elements disposed ahead, in the sequence of key elements, of those involved in the block 8, the block 7 becomes a front block with respect to the block 8, while the block 8 becomes a rear block with respect to the block 7. Block decision areas (hereinafter referred to as a header) are provided in the blocks 7, 8, which areas have rear stage block specifying parts 15, 16 for specifying in which respective blocks identification numbers following the last identification numbers 120, 250 of the respective blocks 7, 8 are existent. In this case, information for specifying the block 8 is stored in the rear stage block specifying part 15 of the block 7, while information for specifying a further rear stage block (not shown) behind the block 8 is stored in the rear stage block specifying part 16 of the block 8.

The key elements 9, 10, 11, and 12 described above have length indication parts 19, 20, 21, and 22 for specifying the lengths of the key elements themselves and are required for finding positions of the next key elements in the blocks 7, 8. For example, retrieving the indication part 19 of the key element 9, the length of the key element 9 is found. Consequently, after retrieving the key element 9 in an amount corresponding to the length of the key element 9, head data of the next key element 10 can be found. Moreover, the key elements 9, 10, 11, and 12 have position indication parts 23, 24, 25, and 26 for indicating at which addresses respective corresponding informations A1 to A4 are located in the information storage part 1. Prescribed information is entered in these length indication parts and the position indication parts in preparing the key elements 9 to 12. Furthermore, designated at 27 is a memory having a plurality of information storage areas 28, 29, 30, and 31.

Designated at 32 is a controller which stores in the memory 27 informations from the information storage part 1 in the order of arrangement of the identification numbers 010, 120, 130 and 250 based on instructions from the indexed part 6 described above. Namely, the controller 32 includes an element read means 32b operated based on an input from a forward read setting means 32a such as a switch, etc., for retrieving the blocks 7, 8 in the order of the arrangement of the key elements, i.e., from the left to the right in the figure, and for thereby reading the key elements 9 to 12 and delivering them to the memory 27, and a block indication means 32c for reading the rear stage block specifying parts 15, 16 after the element read means 32b finishes reading the key elements in each block, and for indicating to the element read means 32b the next block. Moreover the element read means 32b, after reading the respective key elements 9 to 12, detects, from the position indication parts 23 to 26, at which position in the information storage part 1 an identification number for each key element is located, and reads the identification numbers, i.e., corresponding identification codes k and the informations A1 to A4 from the information storage part 1 for storing them in the memory. Consequently, once the element read means 32b reads all the key elements 9, 10 of the block 7, for example, the block specifying means 32c reads the information of the rear stage block specifying part 15. Since the block 8 has been specified in the rear stage block specifying part 15, the block specifying means 32c instructs the element read means 32b to retrieve the block 8, and thereby the element read means 32b retrieves from the block 8 the first key element 11. For the forward read setting means 32a, a switch interlocking with a specific key on a key board is available.

Such prior information storage systems are described in for example "Electronic Computer Programming Language COBOL" JIS C 6205-1980, issued by Japanese Standard Association, and "FACOM CSP/F5"

JIS COBOL E Syntax, 45SP-3102-1 published by Fujitsu Inc. These systems can call records in the increasing and decreasing orders of reference keys.

Let us here describe the whole operation of the prior information storage system described above. First, to initially enter informations in the increasing order of the identification numbers 010, 120, 130, and 250 and to then store them, the indexed part 6 is prepared while structured as shown in FIG. 4, upon preparing an indexed file. Such operation is effected with key operation while permitting an operator to observe a display. The key elements 9, 10, 11, and 12 are successively arranged in the increasing order of the identification numbers 010, 120, 130, and 250. With informations are stored in the increasing order of the identification numbers 010, 120, or 130, 250, i.e., in the arrangment order of the key elements based on the indexed file so prepared, the read setting means 32a is turned on. As a result, the forward read means 32b successively takes out the key elements 9, 10, involved in the front stage block 7 starting from the head in the block 7, i.e., from the key element 9 toward the rear key element 10 and further takes out the last key element 10 in the block 7. Therefore, the block specifying means 32c decides the rear stage block 8 from the rear stage block specifying part 15 serving to specify the block number of the rear stage block present in the header 17 and instructs the element read means 32b to retrieve the block 8. Hereby, the element read means 32b successively takes out in repetition the key elements in the block 8 starting from the head in the block 8, i.e., the key element 11 toward the rear element 12. The element read means 32b furthermore finds positions of corresponding informations A1 to A4, i.e., positions (addresses) in the information storage part 1 from the contents of the position indication parts 23, 24, 25, and 26 each time one of the key elements 9, 10, 11, and 12 is taken, and successively enters the informations A1 to A4 in the memory 27 together with the information codes. Thus, the informations are entered in the increasing order of the identification numbers 010, 120, 130, and 250.

Namely, entering the indexed file of FIG. 4 in the increasing order of the identification numbers 010, 120, 130, and 250, the informations A1 to A4 can be entered in the order of steps S1, S2, S3, and S4 of FIG. 5.

However, prior information storage systems, as described above, are adapted to retrieve information in accordance with the order of arrangement of the key elements and to store the information in the increasing order to the identification numbers 010, 120, 130, and 250, but are incapable of entering the identification numbers 010, 120, 130, and 250 in the decreasing order thereof.

In view of the drawbacks with the conventional information storage systems, it is an object of the present invention to provide an information storage system capable of storing information in the opposite direction to the arrangement the key elements including the identification codes.

SUMMARY OF THE INVENTION

An information storage system according to the present invention is adapted to read the key elements in the opposite direction to the order of arrangement of the identification codes and to successively store information corresponding to the identification codes of the key elements in the memory.

According to the present invention, a controller stores informations corresponding to the identification codes in the memory in the opposite direction to the order of arrangement of the key elements including the identification codes.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
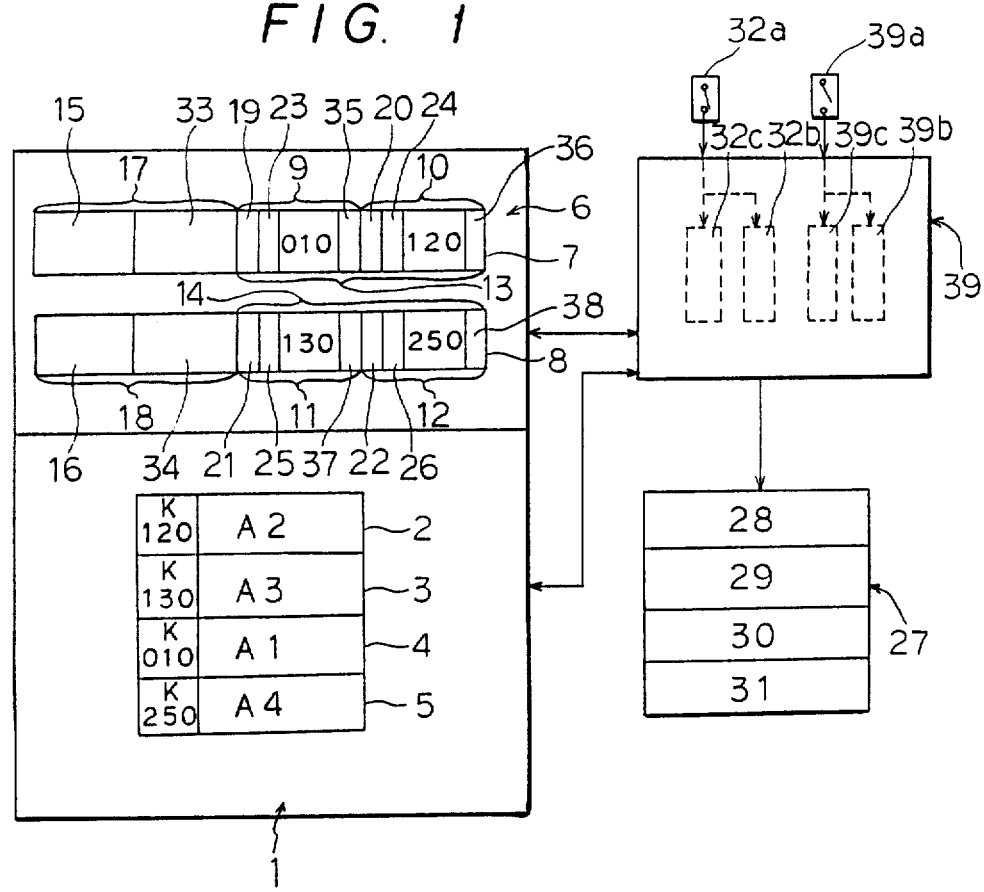
FIG. 1 is a block diagram illustrating an information storage system according to the present invention.

An embodiment of an information storage system according to the present invention will be described with reference to FIGS. 1 to 3. The same symbols shall be applied to the same constituent elements as those in prior arts. Description thereof is therefore neglected here.

In the figures, designated at 33, 34 are front stage block specifying parts provided in the block decision areas 17, 18. In the block specifying parts 33, 34, there set contents indicating which respective blocks contain respective identification codes just before the identification codes 010 or 130 located at the fronts in the respective blocks 7, 8. In addition, designated at 35 to 38 are indication parts for specifying the length of a key element needed to know the position of a front key element. Namely, when the element read means 32b retrieves and reads the respective blocks 7, 8 in a direction from the last key elements 10, 12 to the front elements 9, 11, positions of the key elements 9, 11 in front of the key elements 10, 12 can be decided with use of the contents of these indication parts 36 and 38. The front stage indication parts 33, 34 serving to specify the front stage block and the indication parts 35 to 38 are prepared upon making the indexed file.

Moreover, designated at 39 is a controller in the present invention, which has a special function besides functions thereof present in prior arts. The controller 39 composed of the prior element read means 32b and the block specifying means 32c furthermore includes an element read means 39b adapted to be operatable based on an input from the backward read setting means 39a such as a switch to retrieve the blocks 7, 8 in the opposite direction to the arrangement of the key elements, i.e., from the right to the left in the figure, to detect the identification codes k corresponding to the respective key elements 9 to 12 and read the information A1 to A4 from the information storage part 1 for storing them in the memory 27, and a block specifying means 39c adapted to read, after allowing the element read means 39b to finish reading the key elements for each block, the front stage block specifying parts 33, 34 of the blocks 7, 8 and thereby indicate to the element read means 39b the next. Namely, the controller 39 serves to read the identification numbers 010, 120, 130, and 250 in the opposite order to the arrangement of the identification codes, i.e., in the order 250, 130, 120 and 010, and to read information corresponding to the identification numbers 010, 120, 130, and 250 from the information storage part 1 in accordance with the above read order and store them in the memory 27.

Figure 2:
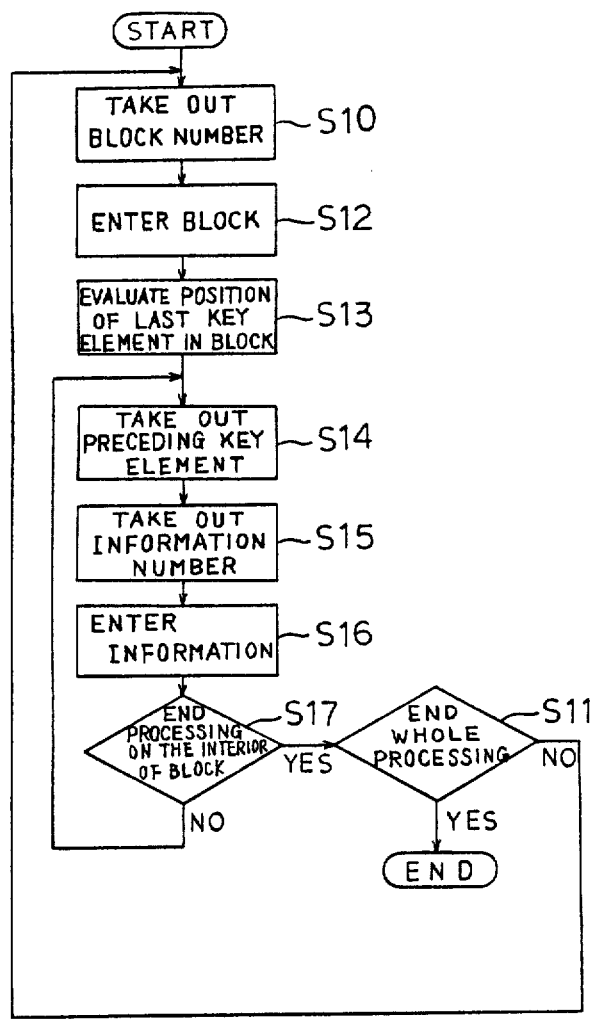
FIG. 2 is a flowchart illustrating an operation of the information storage system of FIG. 1.

Referring here to FIG. 2 illustrating a flowchart showing a method to enter the informations in the decreasing order of the identification numbers 010, 120, 130, and 250, a step S10 represents processing just after initiating the operation, and also processing when the whole processing is finished based on decision in a Step S11. In the step S10, just after the initiation of the operation, the block specifying means 39c takes out a block 8 having the rear key elements 11, 12 contained therein, the block 8 having key elements with the largest identification numbers therein. In the step S12, the block 8 taken out in the step S10 is retrieved. In the step S12, the block 8 includes a plurality of key elements 11, 12 therein, in which they are arranged from the head to the rear of the block in the increasing order of the identification numbers 130, 250. The element read means 39b first takes out the last key element 12 in the block 8, and then takes out in repetition each front key element toward the head element. In a step S13, a position of a key element to be finally read out in the block 8 is evaluated. Since the lengths of the key elements 9 to 12 are not constant, a head position of the front key element 11 is evaluated by subtracting lengths of the front key element located just before the head positions of the key element 12 which has already been processed from the head position of the key element 12. In a step S14, the position evaluated in the step S13 of the head position of the key element 12 already processed is subtracted from a position just before the above head position of the key element 12, i.e., the last position of the front key element 11, by the length of the front key element 11 whereby the head position of the key element 11 to be subsequently processed is evaluated. This evaluation is executed by an evaluation means additionally provided in the controller 39. A position indication part 37 included in the key element 11 taken out in the above step S14 is taken out in a step S15, which information is entered into the memory 27 in a step S16. The operation is decided to be NO in a step S17 until information about the smallest identification number 130 in the block 8 has completely been entered, and the processing concerned is repeated in the above steps of S14, S15, and S16. In such a manner, the retrieving and reading processings are repeated starting from the key element 12 arranged in the rear in the block 8, i.e., having the largest identification number, to the key element arranged further ahead in the block 8, i.e., having a smaller identification number. Provided that the retrieving and reading operation on the interior of the block 8 is finished based on the decision in the step S17 but on the whole the blocks are not all finished based on the decision in the step S11, the operation is returned to the processing in the step S10. The front stage block indication part 34 located in the block header 18 shows, upon the completion of the retrieving and reading operation about the block 8, in which block a key element having a smaller identification number next to the identification number 130 located in the block 8 is present. Accordingly, in the step S10, the block specifying means 39c takes out the contents of the front stage block specifying part 34 located in the header 18 of the block 8 which has already been processed. It is in such a manner repeated in the blocks 7 and 8 to take out the key elements 9 to 12 in reverse order and take out a block located in the front. Thus, informations can be entered in the decreasing order o the identification numbers of 010, 120, 130 and 250 after taking out the key element concerned.

Figure 3:
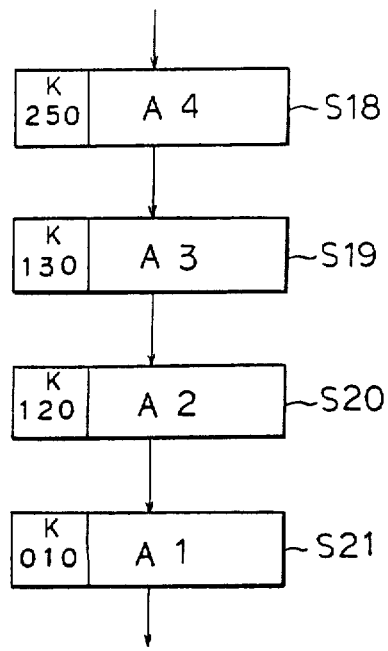
FIG. 3 is a view illustrating the operation of FIG. 2.
Figure 4:
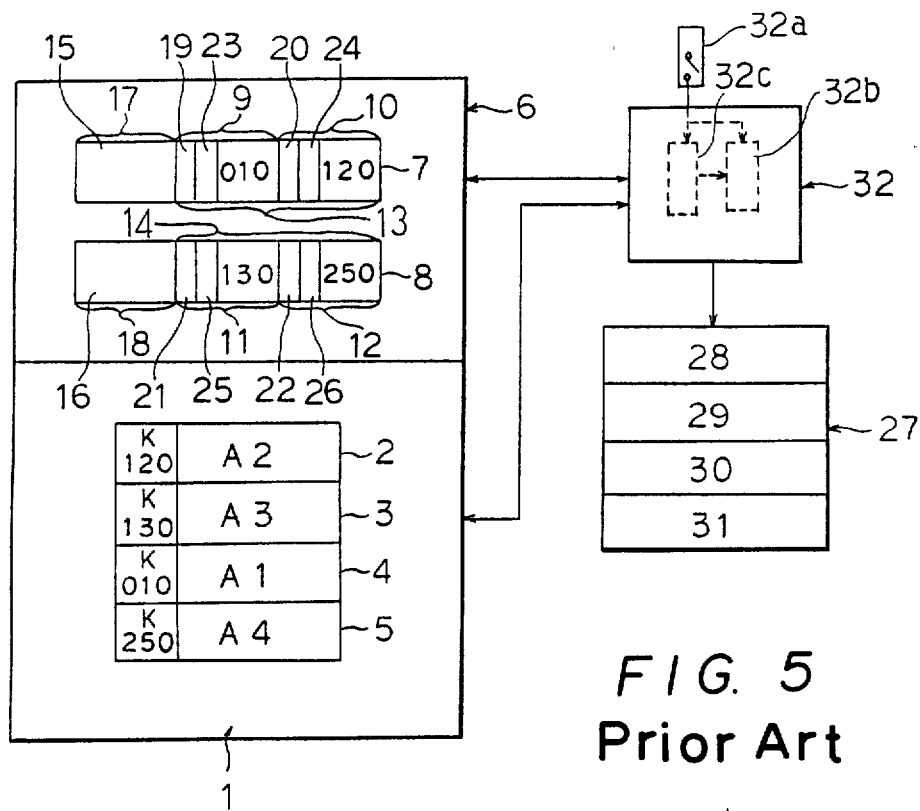
FIG. 4 is a block diagram illustrating a prior information storage system.
Figure 5:
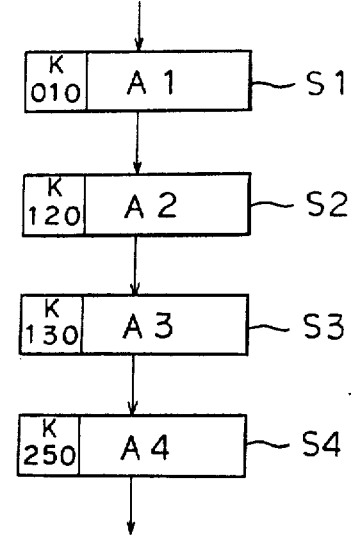
FIG. 5 is a view illustrating the operation of FIG. 4.

Processing the indexed file arranged as shown in FIG. 1 by making use of the method shown in FIG. 2, the information concerned can be entered in the order of the steps of S18, S19, S20, and S21 of FIG. 3. Furthermore, as described before, any information can be entered in the order shown in FIG. 5 when the forward-/backward read setting means 32a is turned on.

Thus, according to the present invention, information in the indexed file can be entered in the opposite direction to the arrangement of the key elements, i.e., in the decreasing order of the identification numbers 010, 120, 130, and 250. Consequently, provided dates are provided as key values, they can advantageously stored successively from a new information on the dates. In addition, the information stored in the memory 27 is taken out by means of a printer or a display (not shown), and thereby the information can be captured with visual observation for decision.

Moreover, although in the embodiment described above a case based on the indexed file was described, a relational database and network database which are accessible with use of the keys may be otherwise applied to manifest the same effect as the embodiment described above. Furthermore, although in the above embodiment each of the front stage block specifying parts 33, 34 serving to specify a front block was disposed behind the rear block specifying parts 15, 16 serving to specify a rear stage block, they may be disposed in the front.

According to the information storage method, the key elements can be read out in the opposite order to the order of arrangement of the key elements including identification codes. And, in conforming with the order of the key elements read out, informations corresponding to the identification codes involved in the key elements can be subsequently stored in the memory. Thus, the information storage system according to the present invention can advantageously extend the coverage of applicability thereof.

Although a certain preferred embodiment has been shown and described, it should be understood that many changes and modifications may be made therein without departing from the scope of the appended claims.

What is claimed is:

1. An information storage system comprising:
  (a) an information storage part including a plurality of information storage areas which each store a piece of information and which each have associated therewith a respective one of plurality of different identification codes;
  (b) an indexed part including a plurality of key elements which are each associated with a respective one of said identification codes which are arranged in a predetermined sequence, and which are divided into a plurality of mutually exclusive blocks which each contain a prescribed number of successive said key elements;
  (c) a memory including a plurality of information storage areas;
  (d) a controller having forward and backward read setting parts; and (e) a front stage block specifying part associated with each said block, each said front stage block specifying part identifying a block which is different from the block associated therewith and which contains the key elements which in said predetermined sequence immediately precede the key elements in the block associated with such front stage block specifying part, said controller including means responsive to said backward read setting part for retrieving from said indexed part all of said key elements in a reverse order opposite to said predetermined sequence by carrying out for each said block, beginning with the block containing the last key elements in said predetermined sequence, a retrieval of the key elements in such block and then a retrieval of said front stage block specifying part which is associated with such block and which identifies the next said block to be handled, for using the identification code for each said retrieved key element to retrieve from said information storage areas in said information storage part the piece of information associated with such identification code, and for storing said retrieved pieces of information respectively corresponding to respective said key elements in successive said information storage areas of said memory in an order corresponding to said reverse order of said key elements.

2. An information storage system according to claim 1, wherein each said key element includes an indication part for specifying the length of the key element itself.

3. An information storage system according to claim 1, wherein each said key element includes a position indication part for indicating the location in said information storage part of the piece of information corresponding to the identification code associated with the key element itself.

4. An information storage system according to claim 1, wherein said means in said controller stores in each said information storage area of said memory in addition to a respective said piece of information, the respective identification code associated therewith.

5. An information storage method carried out using an information storage part including a plurality of information storage areas which each store a piece of information and which each have associated therewith a respective one of a plurality of different identification codes, an indexed part including a plurality of key elements which are each associated with a respective one of said identification codes, which are arranged in a predetermined sequence and which are divided into a plurality of mutually exclusive blocks which each contain a prescribed number of successive said key elements, a memory including a plurality of information storage areas, a controller including forward and backward read setting parts which can each be actuated, a rear stage block specifying part associated with each said block and identifying another said block containing the key elements which in said predetermined sequence immediately follow the key elements in the block associated with such rear stage block specifying part, and a front stage block specifying part associated with each such block and identifying another said block containing the key elements which in said predetermined sequence immediately precede the key elements in the block associated with such front stage block specifying part, said method comprising the steps of:

retrieving and reading into said controller, when said forward read setting part is actuated, the key elements contained in said blocks in an order corresponding to said predetermined sequence of the key elements, including after reading from each said block the key elements therein the step of reading said rear stage block specifying part which is associated with such block and which identifies the next block to be handled; and retrieving from said information storage part the pieces of information corresponding to the identification codes which in turn correspond to the retrieved key elements, and storing said pieces of information in the information storage areas of said memory in order corresponding to said predetermined sequence of said key elements; and retrieving and reading into said controller, when said backward read setting part is actuated, the key elements contained in said blocks in a reverse order opposite to said predetermined sequence of the key elements, including after reading from each said block the key elements therein the step of reading said front stage block specifying part which is associated with such block and which identifies the next block to be handled; and retrieving from said information storage part the pieces of information corresponding to the identification codes which in turn correspond to the retrieved key elements, and storing said pieces of information in the information storage areas of the memory in an order corresponding to said reverse order of said key elements.

6. An information storage system, comprising:

an information storage part having a plurality of information storage areas which each store a respective piece of information;

an indexing part having a plurality of blocks which are arranged in a predetermined sequence and which each have first and second block specifying parts respectively identifying the next successive and next preceding blocks in said predetermined sequence, each said block further having therein a predetermined number of key elements which are arranged in a predetermined order and which each include a position indicator identifying the location in said information storage part of a respective one of said pieces of information;

a memory; and a controller which includes first means responsive to the occurrence of a first predetermined condition for using said first block specifying parts to retrieve said blocks in said predetermined sequence, for reading the key elements from each said retrieved block in said predetermined order, for retrieving from said information storage part using said position indicator in such key element the piece of information corresponding to each key element, and for storing in said memory said pieces of information corresponding to each of said key elements in an order corresponding to the order in which the key elements were successively retrieved; and wherein said controller includes second means responsive to the occurrence of a second predetermined condition for using said second block specifying parts to retrieve said blocks in a reverse sequence opposite to said predetermined sequence, for reading the key elements from each said retrieved block in a reverse order opposite said predetermined order, for retrieving from said information storage part using said position indicator in each key element the piece of information corresponding to such key element, and for storing in said memory said pieces of information corresponding to each of said key elements in an order corresponding to the order in which the key elements were successively retrieved.

* * * * *

UNITED STATES PATENT AND TRADEMARK OFFICE
CERTIFICATE OF CORRECTION

PATENT NO. : 4 807 122

DATED : February 21, 1989

INVENTOR(S) : Kazuyuki BABA

It is certified that error appears in the above-identified patent and that said Letters Patent is hereby corrected as shown below:

Column 8, line 9; after "in" insert ---an---.

Signed and Sealed this

Fourteenth Day of November, 1989

*Attest:*

JEFFREY M. SAMUELS

*Attesting Officer*    *Acting Commissioner of Patents and Trademarks*